United States Patent [19]

Odaka et al.

[11] Patent Number: 4,738,408

[45] Date of Patent: Apr. 19, 1988

[54] TAPE WINDING APPARATUS AND METHOD

[75] Inventors: Toshiya Odaka; Kouichi Sota; Jun Taniguchi; Hiroshi Yamaguchi, all of Tokyo, Japan

[73] Assignee: Otari Electric Company, Ltd., Tokyo, Japan

[21] Appl. No.: 895,659

[22] Filed: Aug. 12, 1986

[30] Foreign Application Priority Data

Feb. 28, 1986 [JP] Japan .................................. 61-44712

[51] Int. Cl.⁴ ...................... B65H 75/28; G03B 1/04; G11B 15/32
[52] U.S. Cl. ................................. 242/197; 242/56 R; 242/195
[58] Field of Search ................... 242/56 R, 56 A, 182, 242/183, 184, 185, 197, 71.1, 67.1 R, 195

[56] References Cited

U.S. PATENT DOCUMENTS

| | | | |
|---|---|---|---|
| 2,361,795 | 10/1944 | Roesen | 242/56 R |
| 2,599,942 | 6/1952 | Roen | 242/56 R |
| 3,030,042 | 4/1962 | De Gelleke | 242/56 R |
| 3,693,900 | 9/1972 | Bohn | 242/56 R |
| 4,519,553 | 5/1985 | Campbell et al. | 242/56 R |
| 4,617,719 | 10/1986 | Woodley | 242/56 R X |
| 4,635,869 | 1/1987 | Woodley | 242/67.1 R |

Primary Examiner—Stuart S. Levy
Assistant Examiner—Joseph J. Hail, III
Attorney, Agent, or Firm—Schwartz & Weinrieb

[57] ABSTRACT

A tape winding apparatus for winding tape supplied from a tape reel mounted upon a supply reel base onto at least one empty takeup reel contained in a cartridge case having an opening at a part thereof, comprises a cartridge holder for holding and positioning the cartridge case, a winding shaft for revolving the takeup reel of the cartridge case, a tape retainer capable of retaining a beginning portion of the tape, the tape retainer bringing the beginning portion of the tape from within the vicinity of the opening provided on the cartridge case to the interior of the cartridge case close to the takeup reel, while holding the beginning portion of the tape, and a coating arrangement for applying an adhesive to the beginning portion of the tape retained on the tape retainer, whereby securing of the tape to the takeup reel can be achieved. A tape winding method comprises the steps of positioning the cartridge case, applying an adhesive to the beginning portion of the tape retained upon the tape retainer, thereby adhering the tape to the takeup reel, bringing the beginning portion of the tape from the opening provided on the cartridge case to the interior of the cartridge case close to the takeup reel, securing the beginning portion of the tape to the takeup reel, and revolving the takeup reel.

6 Claims, 5 Drawing Sheets

TAPE WINDING APPARATUS AND METHOD

FIELD OF THE INVENTION

The present invention relates to a tape winding apparatus and method, and more particularly to a tape winding apparatus and method in which magnetic tape is wound onto a single reel contained within a tape cartridge case.

BACKGROUND OF THE INVENTION

There have been proposed and marketed to date a variety of previously-known types of tape cartridges in which tape is contained.

Figure 5:
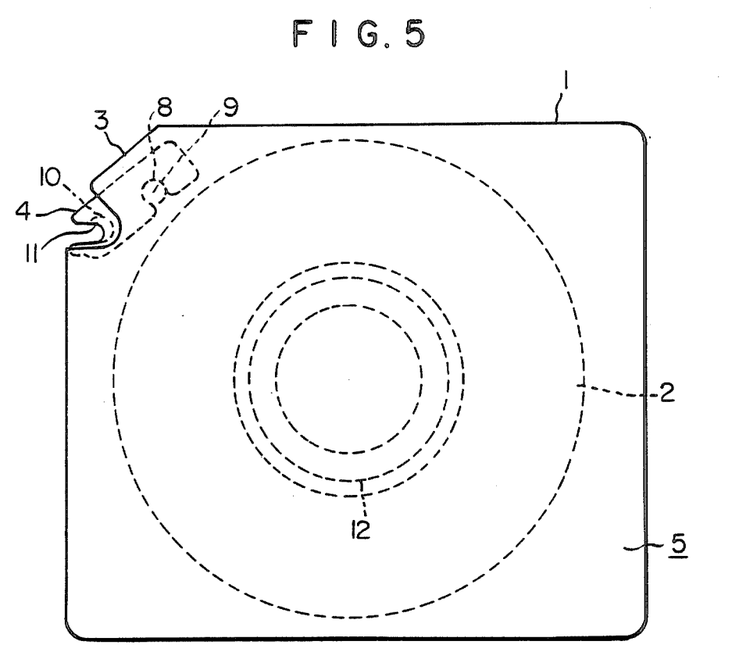
FIG. 5 is an illustration of a cartridge case.
Figure 6:
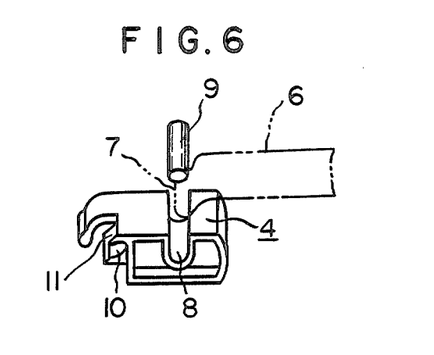
FIG. 6 is an illustration of a leader block.

FIG. 5 shows a tape cartridge 5 that is an example of the previously-known types of tape cartridges in which the tape can be suitably wound by means of a tape winding machine, an embodiment of which will be disclosed hereinafter according to this invention. The tape cartridge 5 is constructed in such a way that a closed cartridge case 1 has a tape reel 2 rotatably disposed therein. The cartridge case 1 also has a leader block 4 detachably disposed in an opening 3 provided within a corner portion thereof. The tape cartridge 5 is initially empty when the tape is not wound therein. The tape cartridge 5, as shown in FIG. 6, is completed when the tape cartridge 5 has the tape wound upon the tape reel 2 and at the same time, an end 7 of the tape 6 is clamped within a concave recess 8 of the leader block 4 by means of a tape retainer 9. To withdraw the tape 6 from the completed tape cartridge 5, a pin is inserted into a hole 10 formed within a front part of the leader block 4 and also into a hole 11 having a diameter smaller than that of the hole 10 which is open at one end thereof, the pin being movable together with the leader block 4. To rewind the drawn-out tape into the tape reel 2, on the other hand, the tape reel 2 is rotated in the clockwise direction with an opening 12 provided on the cartridge case 1 for engagement with a rotary drive shaft of the apparatus, not shown.

The tape cartridge 5 described above has been manufactured in such a manner that the tape is wound on the tape reel 2, the tape reel 2 is contained within the cartridge case 1, the beginning of the tape is drawn out from the opening 3 of the cartridge case 1, and the tape is clamped to the leader block 4.

However, the previous tape cartridge manufacturing method mentioned above is disadvantageous in that it is not easy to handle the tape reel 2 having the tape wound thereon, and in addition, it is difficult to automate the manufacturing process.

OBJECTS OF THE INVENTION

An object of the present invention is to provide a novel tape winding machine which is suitable to automate the process wherein the tape is wound upon an empty tape reel built into a tape cartridge case.

Another object of the present invention is to provide a method of winding the tape in which the tape is supplied from a tape reel onto the empty takeup reel of the cartridge.

SUMMARY OF THE INVENTION

In carrying out the present invention in one preferred mode, the tape winding apparatus for winding tape supplied from a tape reel mounted upon a supply reel base onto at least one empty takeup reel contained in a cartridge case having an opening defined within a part thereof, comprises a cartridge holding means for holding and positioning the cartridge case, a winding shaft for revolving the takeup reel, a tape retaining means capable of retaining a beginning portion of the tape from the opening of the cartridge case through the interior of the cartridge case so as to be close to the takeup reel, while holding the beginning of the tape, and a coating means for applying an adhesive to the beginning of the tape held on the tape retaining means, whereby securing of the tape to the takeup reel is achieved.

The tape winding method comprises a process for positioning the cartridge case, a process for applying an adhesive to the beginning of the tape held on the tape retaining means, whereby securing of the tape to the takeup reel is achieved, a process for bringing the beginning of the tape from the opening of the cartridge case through the interior of the cartridge case so as to be close to the takeup reel, a process for securing the beginning of the tape to the takeup reel, and a process for revolving the takeup reel.

An advantage of the invention is that it can be operated in a very simple way in view of the fact that the tape reel can be contained in the cartridge case in advance before the tape is wound onto the tape reel. The beginning of the tape can be automatically clamped to the tape reel before the tape is wound onto the tape reel. This facilitates easy automation of the whole process of winding the tape.

BRIEF DESCRIPTION OF THE DRAWINGS

The foregoing objects and advantages and other more specific objects will be evident when proceeding through the following detailed description of the preferred embodiments of the present invention, particularly when considered in connection with the accompanying drawings, wherein.

DETAILED DESCRIPTION OF THE PREFERRED EMBODIMENT

Figure 1:
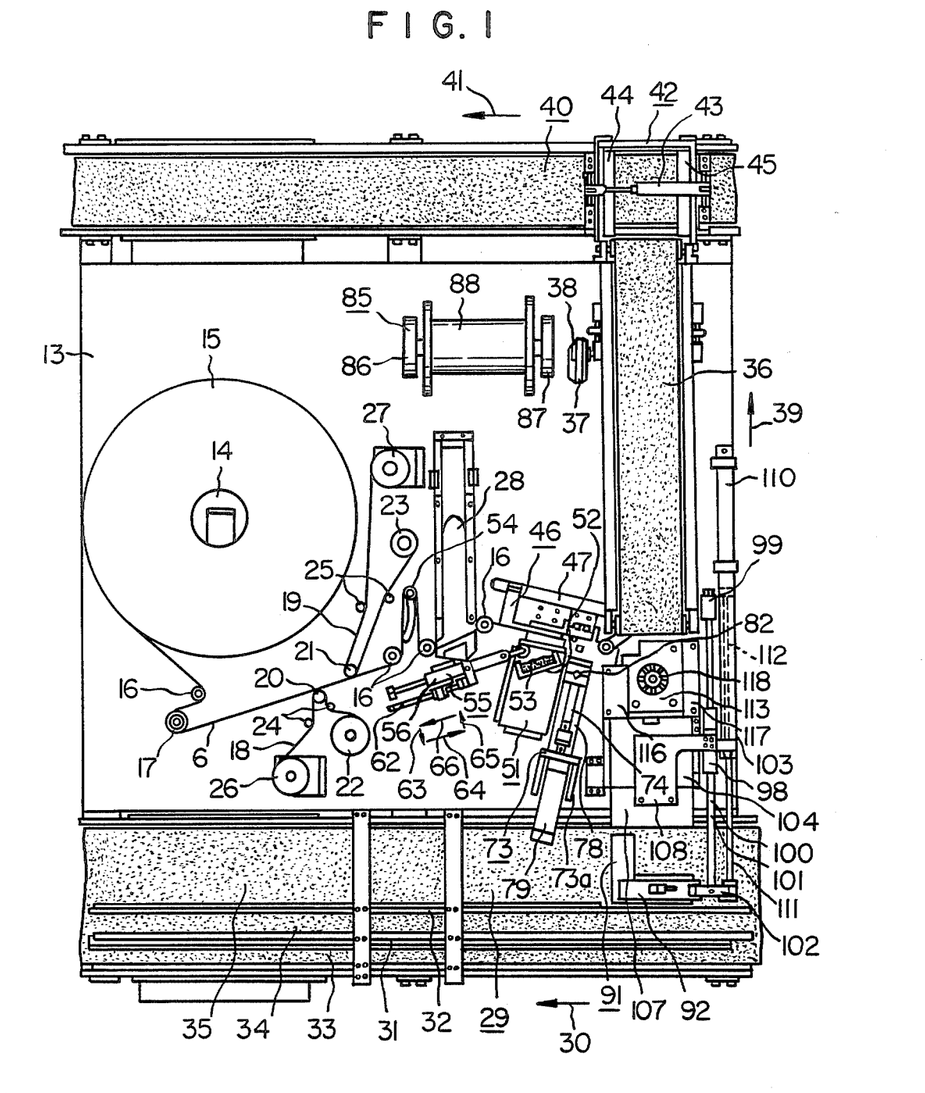
FIG. 1 is a fragmentary plan view of a tape winding machine in accordance with the present invention, together with apparatus associated therewith.

Referring now to the drawings, wherein like reference characters designate like or corresponding parts throughout the several views, FIG. 1 is a plan view of the entire apparatus of a preferred embodiment of the present invention and associated elements thereof. In FIG. 1, a panel base 13 has a tape 6 disposed thereon. The tape 6 is supplied via tape guides 16 from a tape reel 15 mounted on a reel base 14 which is driven by means of a motor (not shown). The panel base 13 also has a counter roller 17 mounted thereon in the path of the tape 6. The counter roller 17 is coupled to a tape counter (not shown) which detects the running speed of the tape 6. A tension arm 54 is provided to detect the tension of the tape 6 in such a manner that the tension arm 54 can change its position depending upon the tension of the tape 6. Cleaner tapes 18 and 19 are provided so as to clean the tape 6 in such a manner that the cleaner tapes 18 and 19 can be unwound from cleaner tape supply rolls 22 and 23 onto cleaner tape takeup rolls 26 and 27 via guide posts 24 and 25 so as to be brought into contact with the tape 6 by means of external surfaces of roller 20 and 21, respectively. An air column 28 is provided so as to slacken the tape 6 as necessary as a result of the air column 28 being connected to a negative air pressure source (not shown).

Also, in this embodiment there is provided a cartridge supply conveyor 29 which is provided for moving empty tape cartridges 5 (shown in FIG. 5) in a direction indicated by arrow 30. The cartridge supply conveyor 29 has areas 33, 34 and 35 partitioned by means of rails 31 and 32. Most of the tape cartridges 5 can be conveyed to the area 33 or 34, in a stand-up mode. From among the tape cartridges 5 disposed with either the area 33 or 34 there can be selected those tape cartridges which can be moved to the tape winding machine so as to be turned over by means of a turn-over mechanism (not shown). The turned-over tape cartridges 5 can be moved from either the area 33 or 34 to the area 35, and can then be conveyed onto the area 35, with the bottom side thereof down.

This embodiment has a cartridge eject conveyor 36 provided so as to eject, in a direction indicated by arrow 39, the tape cartridges 5 that have been completed as will be described later. The cartridge eject conveyor 36 can always be moved in the direction indicated by arrow 39 by means of a pulley 38 which is driven by means of a belt 37 moved by means of a drive source (not shown). A cartridge eject arrangement 42 is provided so as to eject the tape cartridge 5 from the cartridge eject conveyor 36 onto a cartridge collection conveyor 40. To eject the tape cartridges 5, the cartridge eject arrangement 42 has a pair of switching levers 44 and 45 which are opened or closed by means of a cylinder 43.

The cartridge collection convenyor 40 can receive and convey the completed tape cartridges 5 in a direction indicated by arrow 41 from the cartridge eject conveyor 36. The cartridge collection conveyor 40 can always be moved in the direction indicated by arrow 41 by means of a drive source (not shown).

Figure 2:
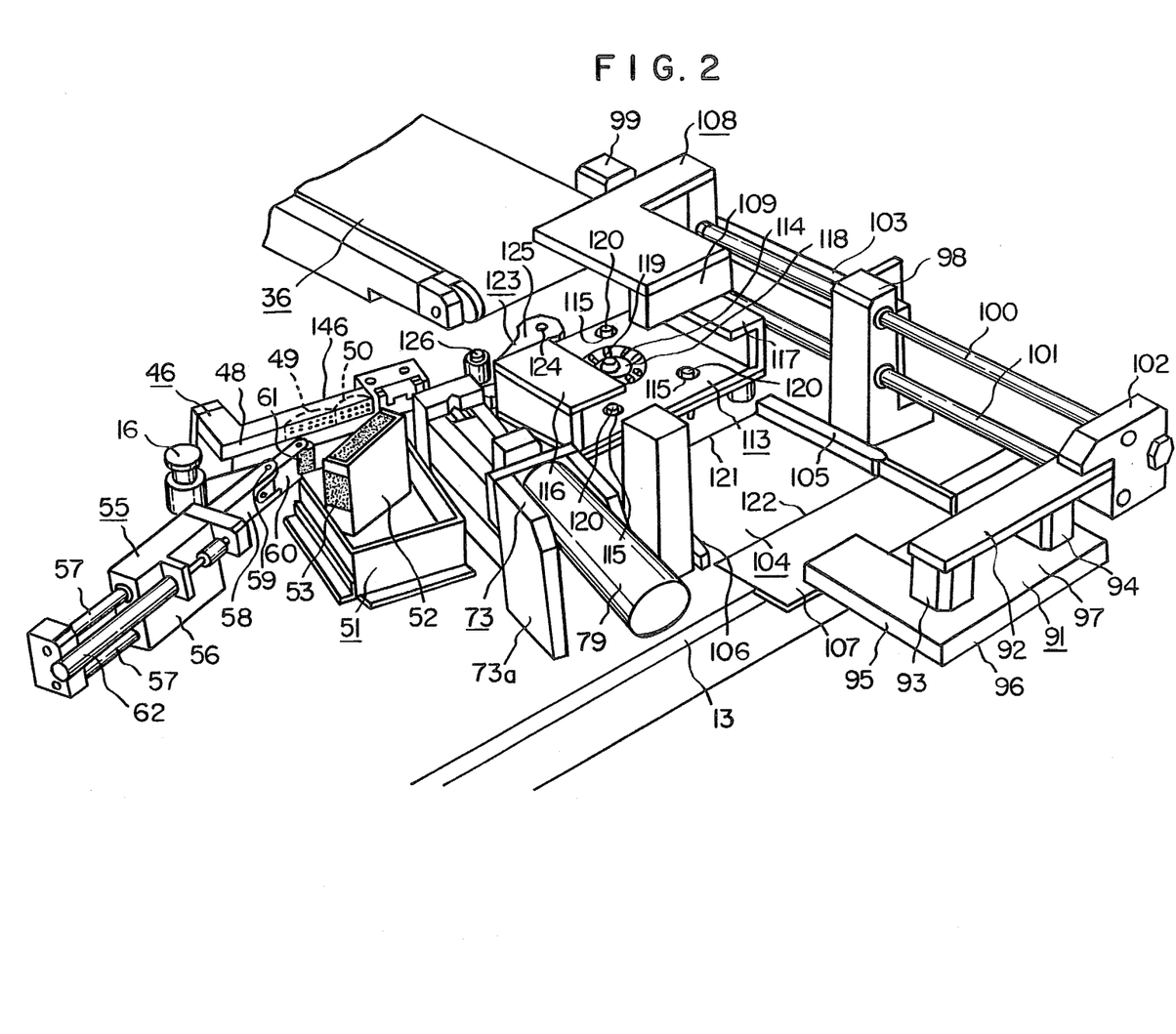
FIG. 2 is a detail view of a tape holder.

This embodiment has a tape holder 46 provided so as to retain the tape 6 upon a surface 48 thereof, as seen in FIG. 2, to detach parts of the tape 6 from the surface 48 while holding the remainder of the tape 6, or to completely detach the tape 6 by releasing the tape 6 from the suction holding state. This can be accomplished in a way described below. The tape holder 46 can be reciprocably moved along a slit hole 47 provided on the panel base 13. An end 146 (shown in FIG. 2) of the tape holder 46 can be inserted into an opening of the cartridge case 1 (shown in FIG. 5). A first group of small holes 49 and a second group of small holes 50 are fluidically connected to two independent vacant rooms (not shown) that can fluidically interconnect the two sets of small holes together inside the tape holder 46. The vacant room for the first group of small holes 49 can be connected to a negative air pressure source (not shown) as necessary; the vacant room for the second group of small holes 50 can be connected to either a negative air pressure source or a high air pressure source (not shown) as necessary. As a result, retention of the tape 6 can be controlled by means of the difference of the air pressures of the first and second groups of small holes 49 and 50.

In FIG. 2, there is shown an adhesive supply 51 that contains a liquid adhesive. Inside the adhesive supply 51 there is provided a sponge 53 supported by means of a sponge holder 52. The sponge 53 always has the adhesive impregnated therein.

Also, in FIG. 2 there is shown a coating arrangement 55 that has a coating arm 58 mounted on a base block 56. The coating arm 58 can be slideably moved by means of a sliding shaft 57, and has at an end thereof an arm 60 that is movable about an axis of a shaft 59 and which is capable of returning to its normal position. The arm 60 has at an end thereof a coating roller 61 which is rotatably supported thereon. The coating arm 58 can be moved by means of a cylinder 62 with respect to the base block 56. The base block 56, as shown in FIG. 1, can be moved by means of a suitable a moving arrangement (not shown) with respect to the panel base 13. The coating roller 61 can be moved in directions indicated by arrows 63, 64, 65, and 66, as seen in FIG. 1, in accordance with the movements of the cylinder 62. As a result, the coating roller 61 shown in FIG. 2 can first come into contact with the sponge 53, then can come within the vicinity of the second group of small holes 50 of the tape holder 46, and then can return to the home position.

Figure 3:
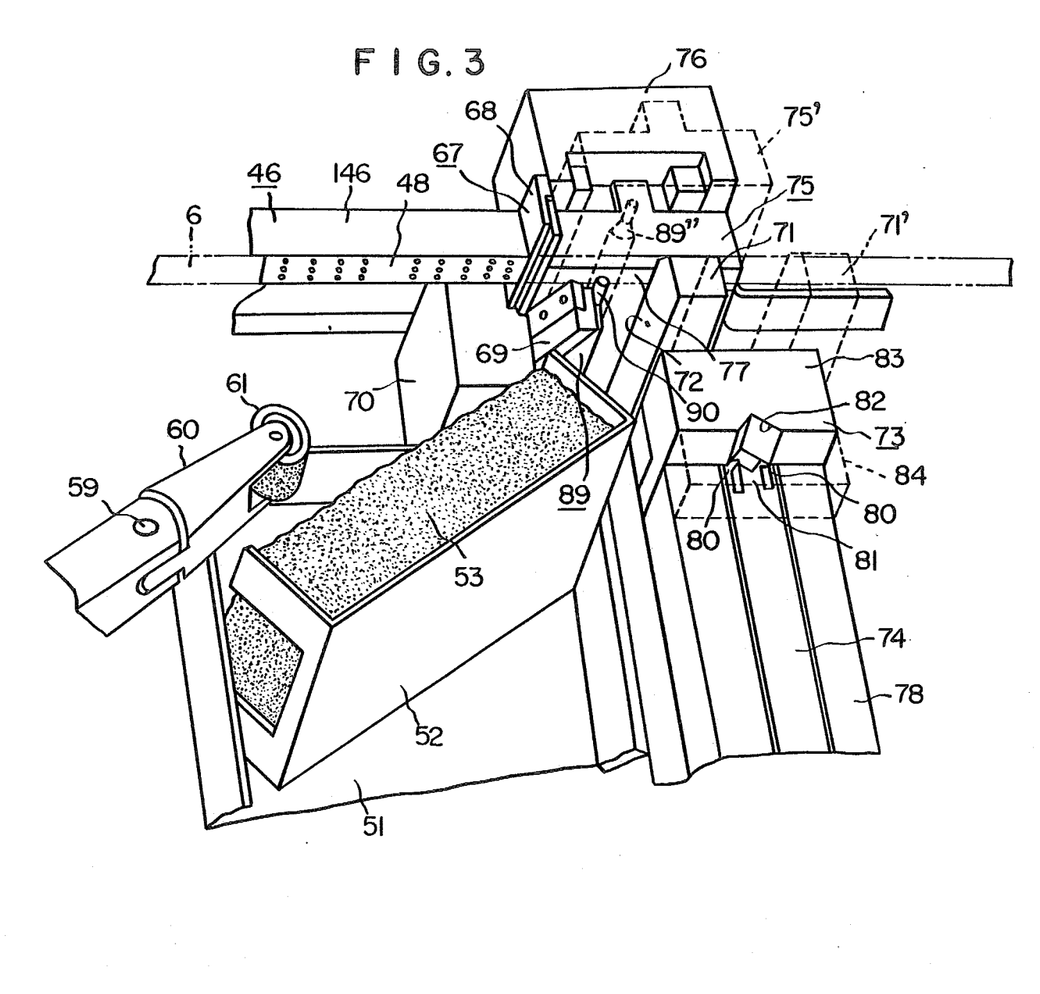
FIG. 3 is a detail view of a tape cutter and means associated therewith.

In FIG. 3 there is shown a cutter 67 comprising a fixed blade 68 and a movable blade 69. The fixed blade 68 is fixed upon a cutter supporting block 70. The movable blade 69 is rotatably mounted upon the cutter supporting block 70. The movable blade 69 can cut the tape 6 placed between the fixed blade 68 and movable blade 69 which is movable by means of a drive source such as a cylinder (not shown). The cutter supporting block 70 can be moved upwardly and downwardly with respect to the tape holder 46 by means of a cylinder (not shown). When the cutter supporting block 70 is at its elevated position, the fixed blade 68 and the movable blade 69 can cut the tape 6 held upon the surface 48 of the tape holder 46. When the cutter supporting block 70 is at its lowered position, the upper edges of the fixed blade 68 and movable blade 69 are beneath the tape holder 46.

Also in FIG. 3 there is shown a moving tape holder 71 that has a surface 72 which faces the surface 48 of the tape holder 46 and is disposed opposite the same at the same level thereof. The surface 72 has a group of small holes (not shown) thereon. The number of these small holes is approximately equal to that of the first group of small holes 49 of the surface 48. The surface 72 is connected to a negative air pressure source as required. This allows the tape 6 to be held by the rear side thereof in addition to the front side thereof which is in contact with the surface 48 of the tape 6.

The moving tape holder 71 can be moved upwardly and downwardly with respect to the tape holder 46 by means of a moving arrangement (not shown). The moving tape holder 71 can also be moved horizontally to a position 71. As a result, the moving tape holder 71 can hold the tape 6 when the holder 71 is in contact with the tape 6 at the raised position thereof. The moving tape holder 71, when lowered, can be positioned lower than a clamp bar 74 of a clamping arrangement 73, which will be described later.

Figure 4:
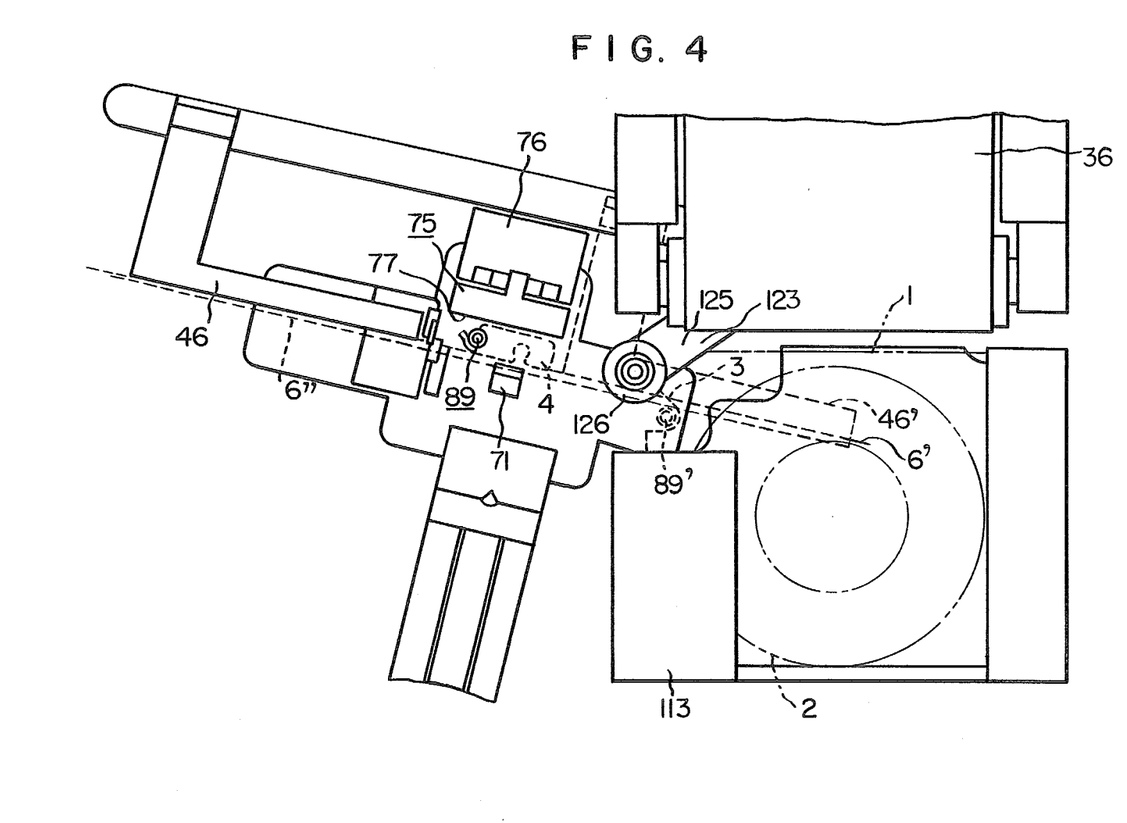
FIG. 4 is a detail view of a tape holder, illustrating the motion thereof.

In FIGS. 3 and 4 there is shown a clamp base 75 that is vertically slidable on a clamp base block 76 which is mounted upon the panel base 13. The clamp base 75 can be moved by means of a cylinder (not shown). The clamp base 75 has a flat surface 77 which is disposed opposite to the clamp bar 74 of the clamp arrangement 73. The clamp base 75, as shown in FIG. 3, can be brought to a position 75' so as to face the clamp bar 74 of the clamp arrangement 73 when the same is in its elevated position. The top of the clamp base 75, on the other hand, can be disposed beneath the clamp bar 74 when the same is moved to its lowered position.

The clamp arrangement 73 is shown in FIGS. 1, 2, and 3. The clamp bar 74 can be guided along a clamp bar guide 78 mounted upon the panel base 13, and is moved through a yoke 73a by means of a cylinder 79 mounted upon the panel base 13. The clamp bar 74, as shown in FIG. 3, has a clamp tip 81 formed at an end thereof so as to press a catch pawl 80 against the tape retainer 9 shown in FIG. 6 and thereby engage the outside of the tape retainer 9. The clamp bar guide 78 has guide blocks 83 and 84 mounted thereon so as to define a tape retaining hole 82 whereby the clamp bar guide 78 can be brought to a position within the vicinity of the clamp tip 81 when the clamp bar 74 is retracted. The clamp bar 74, as described above, can be retracted so that the clamp tip 81 can be brought to the position of the tape retaining hole 82 defined by the guide blocks 83 and 84; the clamp bar 74 can be moved forwardly until the clamp tip 81 thereof reaches a position directly in front of the flat surface 77 of the clamp base 75 which is at the raised position. The tape retainer 9 shown in FIG. 6 can be cut to a specific length by cutting the same from a roll. When an end of the roll is inserted into the tape retaining hole 82 and in front of the clamp tip 81, the roll can be cut by the tape retaining hole 82 and an edge of the clamp tip 81 as the clamp bar 74 moves forwardly.

In FIG. 1 there is shown a tape retainer supply arrangement 85 that has a tape retainer supply roll 88 rotatably supported on roller support blocks 86 and 87 mounted upon the panel base 13. The end of the roll for the tape retainer 9 is inserted in the tape retaining hole 82 of the clamp arrangement 73. The clamp arrangement 73 has a specified-length feed arrangement (not shown) provided to feed and insert a specified length of the tape retainer 9 into the tape retainer hole 82 every time the clamp arrangement 73 operates.

In FIGS. 3 and 4 there is shown a leader block support pin 89 that has a thin tip 90 at an end thereof. The thin tip 90 is fitted into the holes 10 and 11 of the leader block 4 shown in FIGS. 5 and 6. The leader block support pin 89 can be moved with respect to the clamp bar 74. When lowered, the leader block support pin 89 is beneath the clamp bar 74. When raised, the leader block support pin 89 is at a position 89" shown in FIG. 3 at which the concave portion 8 of the leader block 4 faces the clamp bar 74. The leader block support pin 89 can also be moved horizontally, that is, the leader block support pin 89 can be moved to a position 89' shown in FIG. 4 at which it can engage and withdraw the leader block 4 out from the cartridge case 1 in a manner that will be described later. The leader block support pin 89, then, can bring the leader block 4 to the flat surface 77 of the clamp base 75.

In FIGS. 1 and 2 there is shown a takeup lever 91 mounted on a piston shaft (not shown) of cylinders 93 and 94 fixedly mounted upon a lever support arm 92. The takeup lever 91 can be moved vertically with respect to the supply conveyor 29. The takeup lever 91 also has walls 95 and 96 facing the supply conveyor 29, and together with a wall 97 can contain a cartridge case 1.

The lever support arm 92 is mounted on an arm block 102 that is mounted on the ends of slide rods 100 and 101. The slide rods 100 and 101 are slidably mounted within slide bearing blocks 98 and 99. The arm block 102 is also connected to a piston shaft 111 of a cylinder 103 as best seen in FIG. 1. This allows the takeup lever 91 to be vertically moved by the cylinders 93 and 94 and to be reciprocably moved along the slide rods 100 and 101. Initially, the takeup lever 91 is disposed upon the area 35 of the supply conveyor 29 shown in FIG. 1. The area 35, as described previously, has the cartridge case 1 (shown in FIG. 5) disposed thereon with the top thereof directed upwardly. When the cartridge case 1 to be transported is disposed upon the conveyor area 35, the takeup lever 91 descends toward the supply conveyor 29 until the cartridge case 1 is engaged with the wall 95 shown in FIG. 2. The takeup lever 91 can then move so as to move the cartridge case 1 onto an elevator 104 which will be described in the following paragraph.

The elevator 104 has guide rails 105 and 106, along which the elevator 104 can be moved vertically with respect to the panel base 13. The elevator 104 shown in FIG. 2 is at a lowered level at which a guide plate 107 is positioned. The elevator 104, when raised up, is at the same level as the upper surface of the cartridge eject conveyor 36. The elevator 104, when at the lowered level, can receive the cartridge case 1 from the takeup lever 91 described above. The elevator 104 can then raise the cartridge case 1 up to the same level as the upper surface of the cartridge eject conveyor 36.

In FIG. 2 there is shown a shift lever 108 slidably mounted upon the slide rods 100 and 101, having a shift block 109. The shift lever 108 is also connected to a piston shaft 112 of a cylinder 110, as shown in FIG. 1, so that the shift lever 108 can be reciprocally moved along the slide rods 100 and 101.

Also, in FIG. 2 there is shown a cartridge holder 113 that has a takeup shaft hole 114 and positioning pin holes 115 provided thereon. The cartridge holder 113 also has positioning guides 116 and 117 provided on each side thereof forming a channel-shape which can contain the cartridge case 1 with the top thereof directed upwardly. The cartridge holder 113 can be moved vertically by means of a cylinder (not shown).

Further, in FIG. 2 there is shown a takeup shaft 118 that has a plurality of drive blades 119 provided on the upper surface thereof and is connected to a motor (not shown) mounted upon the panel base 13. The takeup shaft 118 can project out of the takeup shaft hole 114 when the cartridge holder 113 is at a lowered position thereof. The takeup shaft 118 can be engaged with a reel 2 through an opening of the cartridge case 1 shown in FIG. 5 when the cartridge case 1 is contained in the cartridge holder 113. This arrangement is not shown in the drawings.

Furthermore, in FIG. 2 there is shown positioning pins 120 that are embedded in the panel base 13. The positioning pins 120 can project out of the positioning pin holes 115 provided on the cartridge holder 113 when the cartridge holder 113 is at the lowered position thereof. The height of the positioning pins 120 can be determined in view of the fact that the positioning pins 120 touch the bottom surface of the cartridge case 1 when the cartridge case 1 is contained in the cartridge holder 113 with the cartridge holder 113 being at the lowered position. The cartridge holder 113 is at approximately the same level as the eject conveyor 36 when the cartridge holder 113 is at the raised position thereof, the same also being in coincidence with the raised position of the elevator 104.

The shift block 109 of the shift lever 108 can reciprocate between one end 121 of the elevator 104 and the other end 122 thereof. The shift lever 108 can slide from the end 122 of the elevator 104 to the end 121 when both the cartridge holder 113 and the elevator 104 are at the raised positions thereof and when both the cartridge holder 113 and the elevator 104 each have a cartridge case 1 contained therein. The cartridge case 1 disposed upon the elevator 104 can then move into the cartridge holder 113 and, the preceding cartridge case 1 disposed within the cartridge holder 113 can be forced out onto the eject conveyor 36.

In FIGS. 2 and 4 there is shown a movable roller mechanism 123 that has a guide roller 126 rotatably mounted upon an end of a movable roller arm 125 which is pivotable around a shaft 124 by means of a drive power source (not shown). The guide roller 126 can move between the vicinity of the opening 3 of the cartridge case 1 shown in FIG. 4 and a position disposed beneath the eject conveyor 36, thereby guiding the running tape 6 to the opening 3.

The overall operation of the tape winding machine according to the present invention constructed in the preferred mode mentioned above is as follows. As shown in FIG. 1, first the tape reel 15 can withdraw the leader of the tape 6 from the reel base 14. The tape reel 15, then, allows the leader of the tape 6 to pass around the tape guide 16, counter roller 17, the rollers 20 and 21, the tension arm 54, and the air column 28. The tape holder 46 can be moved toward the air column 28. The first and second groups of small holes 49 and 50 are made to apply suction to the tape 6 so as to retain the same upon the surface 48 of the tape holder 46. The leader of the tape 6 can be brought to the takeup shaft 118 rather than to the cutter 67. The cutter 67, however can be raised up and actuated so as to cut off a leading portion of the tape 6. The cutter 67 can then be lowered. This completes the preparation for the winding the tape 6.

Second, the tape retainer 9 shown in FIG. 6 having the tape rolled thereon can be mounted on the supply roll 88 shown in FIG. 1. An end of the tape 6 can be inserted into the tape retainer hole 82 of the clamp arrangement 73 by means of a specific feed arrangement (not shown).

The cartridge case 1 shown in FIG. 5 can be conveyed on the lane 35 of the supply conveyor 29 shown in FIG. 1 with the cartridge case 1 facing upwardly.

In FIG. 2, the elevator 104 can initially be disposed at the lowered position thereof, and the takeup lever 91 can be disposed upon the area 35 of the conveyor 29.

The takeup lever 91 can be lowered when the cartridge case 1 is conveyed onto the area 35, and the cartridge case 1 can be engaged by the takeup lever 91. The cartridge case 1 can be shifted to the elevator 104, the takeup lever 91 being disposed at its lowered position so as to place the cartridge case 1 onto the elevator 104. The takeup lever 91 can then be raised and returned to a position above the supply conveyor 29.

Then, the cartridge holder 113 and the elevator 104 are raised up, with the shift lever 108 initially disposed at the end 122 of the elevator 104. The shift lever 108 can then be shifted to the other end 121 of the elevator 104. This can move the cartridge case 1 disposed upon the elevator 104 onto the cartridge holder 113.

The shift lever 108 can then again be returned to the initial position and at the same time, the cartridge holder 113 and the elevator 104 are lowered. As the elevator 104 can be vacant at this stage, a new cartridge case 1 can be supplied from the supply conveyor 29 to the elevator 104 in the same manner as described above.

In turn, initialization can be made in such a way that the guide roller 126 shown in FIG. 4 can be moved toward the eject conveyor 36, the moving tape holder 71 can be lowered, and the clamp base 75 and the leader block support pin 89 are also lowered. After the foregoing procedures, the leader block support pin 89 can be moved to the position 89′ indicated in FIG. 4, and can then be raised. This allows the leader block support pin 89 to support the leader block 4. The leader block support pin 89 can then be brought from the vicinity of the opening 3 of the cartridge case 1 toward the clamp base 75 so as to separate the leader block 4 from the cartridge 1. This allows the leader block 4 to move toward the surface 77 of the clamp base 75, with the leader block 4 supported by the leader block support pin 89. When the leader block support pin 89 is moved toward the surface 77 of the clamp base 75, the leader block support pin 89 can be lowered.

In turn, the coating arrangement shown in FIG. 1 can be moved in the directions indicated by arrows 63, 64, 65, and 66 and in this sequence. This allows the coating roller 61 shown in FIG. 3 to be brought into contact with the sponge 53, then to be brought into contact with the end of the tape 6. As a result, the bonding agent can be applied to the end 6′ of the tape 6. Subsequently, the coating roller 61 can be returned to its initial position. In turn, the tape holder 46, as shown in FIG. 4, can be moved to the position 46′; that is, the tape holder 46 passes through the opening 3 and can enter the cartridge case 1 until an end of the tape holder 46 can reach a core portion of the tape reel 2 disposed within the cartridge case 1. The end of the tape holder 46 can be connected for a short period of time to a high-pressure air source through means of the second group of small holes 50 shown in FIG. 2. This allows the end 6′ of the tape 6 to be secured to the tape reel 2.

In turn, the groups of small holes 49 and 50 of the tape holder 46 are released from the suction source so as to prevent the tape holder 46 from retaining the tape 6. The takeup shaft 118 can then slowly revolve the tape reel 2 two or thee times. This allows the tape 6 to be initially wound on the tape reel 2.

In turn, the tape holder 46 can be returned to the initial position and at the same time, the movable roller 123 can be turned to the position indicated in FIG. 4. This allows the guide roller 126 to come into contact with the tape 6. The tape 6 can be slightly separated from the tape holder 46 as indicated by 6″. The takeup shaft 118 shown in FIG. 2 can then be revolved so as to fully wind the tape 6 onto the tape reel 2.

Obviously, many modifications and variations of the present invention are possible in light of the above teachings. It is therefore to be understood that within the scope of the appended claims, the present invention may be practiced otherwise than as specifically described herein.

What is claimed is:

1. Tape winding apparatus for winding tape, supplied from a tape supply reel mounted upon a tape supply reel base, onto at least one empty takeup reel contained within a tape cartridge having an opening defined within a casing portion thereof for permitting said tape to pass therethrough and a leader block within which an end of said tape is secured, comprising:

cartridge holding means for holding and positioning said cartridge;

leader block support means for withdrawing said leader block from said tape cartridge in preparation for a tape winding operation and for returning said leader block to said tape cartridge upon completion of said tape winding operation;

coating means for applying adhesive means to a beginning portion of said tape to be secured upon said takeup reel of said tape cartridge;

tape retaining means for retaining said adhesive-coated beginning portion of said tape and for transporting said adhesive-coated beginning portion of said tape through said opening defined within said casing portion of said cartridge and into the interior portion of said cartridge casing to within the vicinity of said takeup reel so as to facilitate the fixation of said adhesive-coated beginning portion of said tape upon said takeup reel; and winding shaft means for revolving said takeup reel of said tape cartridge whereby said tape can be fully wound upon said take-up reel of said cartridge.

2. Tape winding apparatus according to claim 1, wherein:

said tape retaining means has a first group of small holes to be selectively connected to a negative air pressure source and a second group of small holes to be selectively connected to either a negative or a positive high air pressure source so as to facilitate said fixation of said tape upon said takeup reel, said first and second groups of small holes being independently functionable and said second group of small holes being disposed closer to an end of said tape retaining means than said first group of small holes.

3. Tape winding apparatus according to claim 2, wherein:

in connection with said tape retaining means, a tape retaining block having a third group of small holes is provided to be selectively connected to said negative air pressure source so as to retain said tape; and a cutting means is provided for cutting said tape retained by said tape retaining means and said retaining block at a point therebetween.

4. Tape winding apparatus according to claim 1, further comprising:

adhesive supply means filled with said adhesive to be applied to said beginning portion of said tape; and coating roller means reciprocably movable between said beginning portion of said tape retained by said tape retaining means and said adhesive supply means for depositing said adhesive upon said beginning portion of said tape.

5. Apparatus as set forth in claim 1, further comprising:

aperture means defined within said leader block; and said leader block support means comprises a leader block support pin engageable within said leader block aperture means.

6. A method for winding tape, supplied from a tape supply reel mounted upon a tape supply reel base onto at least one empty takeup reel contained within a tape cartridge having an opening defined within a casing portion thereof for permitting said tape to pass therethrough and a leader block within which an end of said tape is secured, comprising the steps of:

supporting said cartridge;

withdrawing said leader block from said tape cartridge in preparation for a tape winding operation;

applying an adhesive to a beginning portion of said tape so as to facilitate said beginning portion of said tape being secured upon said takeup reel;

transporting said beginning portion of said tape through said opening defined within said casing portion of said cartridge and into the interior portion of said cartridge casing to within the vicinity of said takeup reel;

bringing said beginning portion of said tape into contact with said takeup reel so as to affix said beginning portion of said tape upon said takeup reel by means of said adhesive;

revolving said takeup reel so as to wind said tape upon said takeup reel;

securing said end portion of said tape within said leader block; and returning said leader block to said tape cartridge so as to complete the fabrication of said tape cartridge with said tape wound therein.

* * * * *